United States Patent
Kulkarni et al.

(10) Patent No.: US 7,698,514 B2
(45) Date of Patent: Apr. 13, 2010

(54) DATA PROCESSING SYSTEM AND METHOD FOR INTERCONNECT ARBITRATION

(75) Inventors: Milind Manohar Kulkarni, Bangalore (IN); Bijo Thomas, Bangalore (IN)

(73) Assignee: NXP B.V., Eindhoven (NL)

( * ) Notice: Subject to any disclaimer, the term of this patent is extended or adjusted under 35 U.S.C. 154(b) by 113 days.

(21) Appl. No.: 11/630,599

(22) PCT Filed: Jun. 14, 2005

(86) PCT No.: PCT/IB2005/051954
§ 371 (c)(1),
(2), (4) Date: Feb. 10, 2009

(87) PCT Pub. No.: WO2006/000944
PCT Pub. Date: Jan. 5, 2006

(65) Prior Publication Data
US 2009/0172226 A1    Jul. 2, 2009

(30) Foreign Application Priority Data
Jun. 21, 2004 (EP) .................... 04102834

(51) Int. Cl.
*G06F 12/00* (2006.01)
(52) U.S. Cl. ............... 711/158; 710/240
(58) Field of Classification Search .............. None
See application file for complete search history.

(56) References Cited

U.S. PATENT DOCUMENTS

| | | | | |
|---|---|---|---|---|
| 5,345,562 A | * | 9/1994 | Chen | 710/110 |
| 5,632,013 A | * | 5/1997 | Krygowski et al. | 714/7 |
| 5,809,314 A | * | 9/1998 | Carmean et al. | 713/322 |
| 6,163,857 A | * | 12/2000 | Meaney et al. | 714/7 |
| 2003/0120878 A1 | | 6/2003 | Andreassen et al. | |

FOREIGN PATENT DOCUMENTS

| | | |
|---|---|---|
| EP | 1 380 961 A1 | 1/2004 |
| EP | 1 403 775 A1 | 3/2004 |
| WO | 02/39290 A2 | 5/2002 |

OTHER PUBLICATIONS

Chandrakasan et al: "Minimizing Power Consumption in CMOS Circuits"; IEEE vol. 83, No. 4; Apr. 1995.

* cited by examiner

*Primary Examiner*—Brian R Peugh

(57) ABSTRACT

A data processing system includes processing units for processing data, at least one memory for storing data from the processing units, an interconnect for connecting the processing units and the memory. The processing units request write access to the memory via the interconnect to write data into the memory. At least one arbiter performs interconnect arbitration for the access to the memory from the processing units, wherein interconnect arbitration is performed based on the minimum logic level changes of the interconnect as introduced by the write accesses of the processing units to the memory. If more than one write request is available from different processing units the interconnect arbitration (interconnect access), is granted to that processing unit, whose data to be sent to the memory via the interconnect results in minimum logic level changes to the interconnect. Power dissipation due to switching of logic levels is reduced.

5 Claims, 1 Drawing Sheet

DATA PROCESSING SYSTEM AND METHOD FOR INTERCONNECT ARBITRATION

BACKGROUND OF THE INVENTION

The present invention relates to a data processing system and a method of interconnect arbitration.

With the increasing availability and success of portable devices like PDA, notebooks, mobile phones, portable MP3-player etc. the power consumption of these devices has become more and more important within modem integrated circuits and the design thereof and a considerable amount of investigation and design efforts have been conducted to reduce the power consumption. As the VLSI design of ICs used in such devices is shifting into the nanometer domain, the energy which is dissipated by the interconnect in a system-on-chip becomes a significant part of the overall system power consumption. Furthermore, a limiting factor for reducing the weight and size of portable devices correlate to the amount of batteries which are required to provide the power dissipated by the electronic circuits within the portable devices.

The power consumption of the interconnect, i.e. the bus or the network, is not only based on the physical properties of the interconnect, like the voltage swing, the wire delay, the topography of the interconnect or the like, but also on the data flow in the system-on-chip, i.e. the processor-processor communication and the processor-memory communication. This communication can be of the following origins: cache and memory transactions (data fetch from shared memory), cache coherence operations (updated data in a shared memory must be updated in all cache copies resulting in synchronization traffic), packet segmentation overheads (segmenting dataflow into packets will introduce an additional data overhead) or contentions between packets (re-routing packets in case of a contention).

SUMMARY OF THE INVENTION

It is therefore an object of the invention to reduce the power consumption within a data processing system comprising a plurality of processing units.

This object is solved by a data processing system according to claim 1 as well as a method for interconnect arbitration according to claim 5.

Therefore, a data processing system comprising a plurality of processing units for processing data, at least one memory means for storing data from said plurality of processing units, an interconnect means for connecting said plurality of processing units and said at least one memory means is provided. Said processing units are adapted to request a write access to said at least one memory means via the interconnect means in order to write data into said at least one memory means. At least one arbiter means is provided for performing an interconnect arbitration for the access to said at least one memory means from said plurality of processing units, wherein said interconnect arbitration is performed based on the minimum logic level changes of said interconnect means as introduced by the write accesses of said plurality of processing units to said at least one memory means.

Accordingly, if more than one write request is available from different processing units the interconnect arbitration, i.e. the access to the interconnect, is granted to that processing unit, whose data to be sent to the memory means via the interconnect results in minimum logic level changes to the interconnect means. Whereby the power dissipation due to the switching of logic levels is reduced.

According to an aspect of the invention, said at least one arbiter means is further adapted to perform the interconnect arbitration by determining the hamming distance between the values of the last sent data and the data to be sent next. Therefore, this provides an easy method for determining the minimum logic level changes in the interconnect.

According to a further aspect of the invention, the arbiter means comprises an enabling/disabling unit for enabling/disabling the interconnect arbitration optimized for power consumption. Accordingly, the interconnect arbitration being optimized for power consumption can be disabled if time critical applications are to be processed by the data processing system.

The invention also relates to a method for interconnect arbitration within a data processing system comprising a plurality of processing units for processing data, at least one memory means for storing data from said plurality of processing units, an interconnect means for coupling said plurality of processing units and said at least one memory means. Said processing units request access to said at least one memory means via the interconnect in order to write data into the memory means. An interconnect arbitration is performed based on the minimum logic level changes of the interconnect being introduced by said processing units writing data to said memory means via the interconnect means.

Further aspects of the invention are described in the dependent claims.

These and other aspects of the invention are apparent from and will be elucidated with reference to the embodiments described hereinafter.

DETAILED DESCRIPTION OF THE EMBODIMENTS

Figure 1:
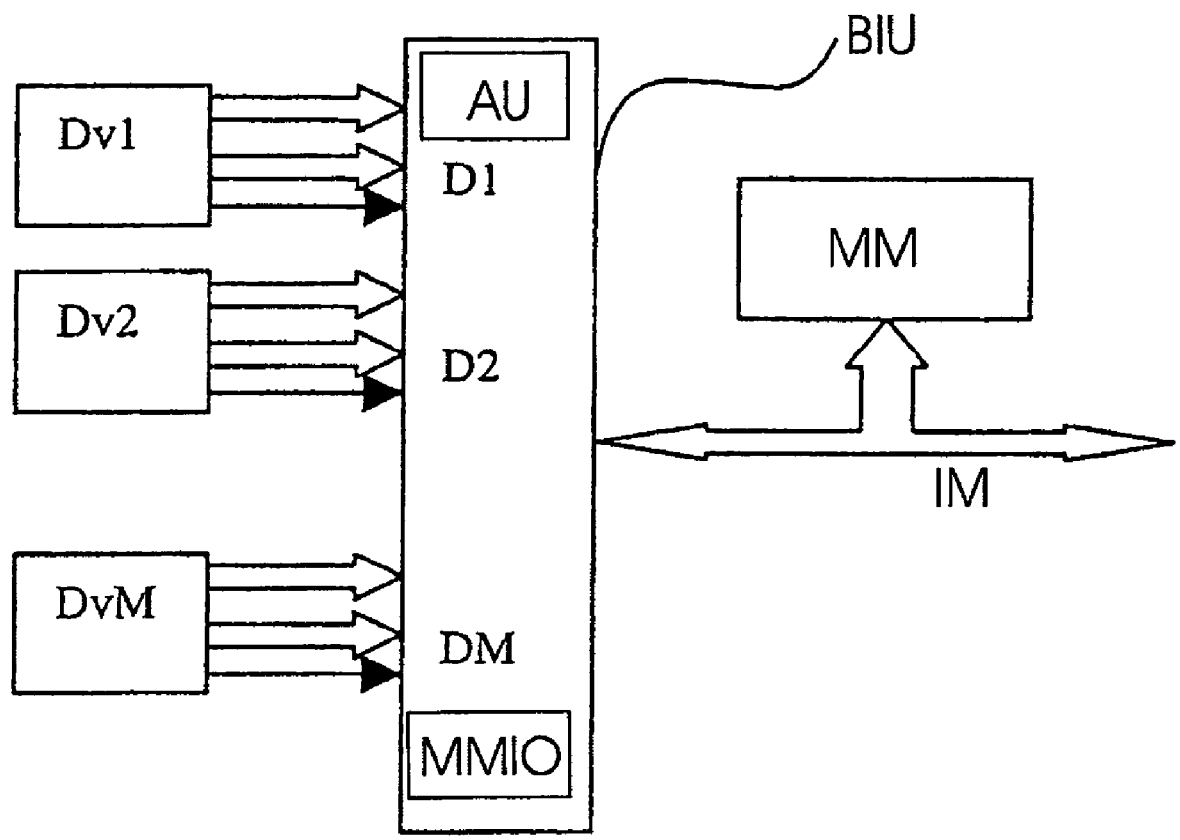
FIG. 1 shows a basic block diagram of a system on chip according to a first embodiment.

In the first embodiment the principle of the invention is described with regard to systems on chip, i.e. a plurality of modules on the same chip, which communicate with each other via some kind of interconnect.

In FIG. 1 a block diagram of a system on chip according to the first embodiment is shown. The system on chip environment comprises a plurality of processing modules Dv1, Dv2, . . . , DvM, a bus interface unit BIU, an interconnect means IM as well as a memory means MM. The processing modules Dv1-DvM are adapted to transfer data D1, D2, . . . , DM, respectively to the memory means MM via the bus interface unit BIU and the interconnect means IM.

The data which have already been transferred from one of the processing modules Dv1-DvM via the bus IM to the memory means MM is considered as D0. However, the processing modules Dv1-DvM are now ready to transfer data D1, D2, . . . , DM, respectively to the memory means MM via the interconnect means IM. The bus interface unit BIU chooses one of these processing units and grants an access to the memory means MM via the interconnect means IM according to the minimum logic level changes which are required for the bus IM to transfer the data D1, D2, DM. This is performed by comparing the content of these data D1-DM to the content of the data D0 which has been previously transferred over the bus IM.

In particular, the bus interface unit BIU comprises an arbiter unit AU for selecting those write requests from the different processing modules Dv1-DvM which require a minimal logic level change on the bus IM and issues a grant for the corresponding process module.

Preferably, this comparison is performed by using a function for determining the hamming distance between the content of the data as being previously sent D0 and the content of the data which are to be transferred. In the bus interface unit BIU all write requests and the corresponding data are buffered and compared to the previous data. This may be performed sequentially or in parallel.

A hamming distance corresponds to the minimum number of bits that have to be changed in order to convert one bit string into another. If x and y are two binary sequences of the same length, the hamming distance between these two sequences is the number of symbols that do not correspond to each other. For example, if x=10000110 and y=01101000, then the hamming distance is the number of bits which change from x to y. Here, this number is 6.

If in the above example M equals 4, then four processing modules Dv1-Dv4 are present in the system on chip according to FIG. 1. These four processing modules will compete for the access to the bus and if simultaneous multiple requests for using the bus IM are being present for the processing module, the bus arbitration has to select one from the four processing modules. For the case that four simultaneous requests have been issued by the four processing modules to transfer the data D1, D2, D3, D4, a bus arbitration is required to determine which of the four request are to be served first. If the word that was placed previously on the bus was D0, the bus arbitration uses a hamming function $h(D0, D_i)$, where $D_i=D1, D2, \ldots, D_N$ (N=4 in this example) such that bit changes between D0 and $D_i$ are minimum. And the device whose request ($D_i$) results in minimum hamming distance is granted the bus access.

For example,
If D0=10101010 and
D1=11110000
D2=00001010
D3=01010101
D4=00110011
Here, $h(D0, D1)=4$, $h(D0, D2)=2$, $h(D0, D3)=8$, $h(D0, D4)=4$. Hence, the access to the bus can be given to processing module Dv2.

Optionally, a memory mapped input output MMIO register is arranged in the bus interface unit BIU or in the arbiter unit AU. This register is used to enable/disable the above-mentioned arbitration scheme based on reducing the power consumption. This power-saving arbitration scheme is activated if an application is to be processed with calculations which are not time-critical. However, if an application is to be processed which comprises time-critical calculations, the bus arbitration scheme for reducing the power consumption can be disabled or switched off for a predetermined period of time or as long as the time-critical application is processed. Thereafter, the power reducing arbitration scheme may be enabled or switched on again. The status of the power reducing arbitration scheme may be stored in the MMIO register. Accordingly, the power-saving bus arbitration scheme can be combined with other conventional bus arbitration schemes. Depending on the criticality of the application, this mode can be switched off/on. This information may be stored in some memory in the bus interface unit BIU. I.e. for an application task graph a particular arbitration mode can be selected at run-time based on a look-up table of the possible application task graphs and the corresponding arbitration modes, which may be stored in the bus interface unit BIU.

Reducing the logic level changes on a bus reduces the power consumption in the overall electrical circuit, as the overall power consumption of a bus is dominated by the power consumption during the switching of the logic levels of the bus. The power consumption due to the changes in logic level are dependent on the clock rate, the supply voltage, the node capacitance and the average number of times in each clock cycle that a node will make a power consumption transition from 0 to 1 or from 1 to 0. For more information regarding the power consumption of a bus please refer to "Minimizing power consumption in CMOS circuits" by Chandrakasan et al., in Proc. of the IEEE, Vol. 83, no. 4, April 1995.

Although the additionally required circuitry for the bus arbitration may consume a certain amount of power, this amount will be significantly less as compared to the power consumption save by reducing the switching in the bus lines. In particular, those data needed to perform the comparison merely are to be transferred from the processing modules to the bus interface unit BIU and not over the interconnect, i.e. the bus. As the bus lines are long and occupy a major portion of the chip these bus lines will require a significant amount of power to be driven.

In an alternative embodiment the interconnect means may be implemented as a network on chip and not as a bus. In a network on chip the processing modules may be coupled to the network via network interfaces which are designed to control the communication between the network and the respective processing modules. Here, the arbiter unit may be implemented in the network interfaces such that an distributed arbitration is achieved. The actual operation of the arbitration is as described according to the first embodiment.

According to a further embodiment the previous content of the bus lines are compared to the actual pending write requests, this may be performed by comparing the previous content with several of data to be transferred over the interconnect to the memory means in order to find a sequence of accesses which in total reduce the required power dissipation.

The invention is based on the idea to provide a bus arbitration policy in order to keep the power consumption in portable or handheld devices minimum. For multiple requests of data transfer over the bus which have been issued by different devices or modules, the bus arbitration is performed by granting an access to the device whose data results in a minimum logic level change or a minimum hamming distance. The minimum hamming distance is calculated by comparing the device data and the previous content on the bus. Additionally, the bus arbiter can switch between the power saving scheme and other bus arbitration schemes.

The invention claimed is:

1. Data processing system comprising
   a plurality of processing units for processing data,
   at least one memory means for storing data from said plurality of processing units
   an interconnect means for connecting said plurality of processing units and said at least one memory means
   wherein said plurality of processing units are adapted to request a write access to said at least one memory means via the interconnect means in order to write data into said at least one memory means
   at least one arbiter means for performing an interconnect arbitration for the write access to said at least one memory means from said plurality of processing units
   wherein said interconnect arbitration is performed based on the minimum logic level changes of said interconnect means as introduced by the write access of said plurality of processing units to said at least one memory means.

2. Data processing system according to claim 1, wherein said at least one arbiter means (AU) is further adapted to perform the interconnect arbitration by determining a hamming distance between a value of a data last sent and a value of a data to be sent next.

3. Data processing system according to claim 1, wherein said at least one arbiter means comprises an enabling/disabling unit for enabling/disabling the interconnect arbitration optimized for power consumption.

4. Data processing system according to claim 1, wherein said interconnect arbitration is performed by comparing a last sent data with a data to be transferred over the interconnect to the memory means in order to determine a sequence of accesses which in total reduce a required power dissipation.

5. A method for interconnect arbitration within a data processing system comprising a plurality of processing units for processing data, at least one memory means for storing data from said plurality of processing units and an interconnect means for coupling said plurality of processing units and said at least one memory means, comprising the steps of:
- requesting access to said at least one memory means via the interconnect in order to write data into the memory means, and
- performing an interconnect arbitration based on the minimum logic level changes of the interconnect being introduced by said plurality of processing units writing data to said at least one memory means via the interconnect means.

* * * * *